United States Patent [19]
Fairchild

[11] 4,357,199
[45] Nov. 2, 1982

[54] APPARATUS FOR FORMING FLEXIBLE TUBING
[76] Inventor: Wayne K. Fairchild, 3620 W. Pendleton Ave., Santa Ana, Calif. 92704
[21] Appl. No.: 213,176
[22] Filed: Dec. 4, 1980
[51] Int. Cl.³ .......................................... B65H 81/04
[52] U.S. Cl. ...................................... 156/428; 72/49; 156/429; 156/446
[58] Field of Search .................... 72/49, 135; 156/143, 156/144, 189, 195, 425, 428, 429, 446, 457

[56] References Cited
U.S. PATENT DOCUMENTS

| | | | |
|---|---|---|---|
| 3,532,580 | 10/1970 | Kanao | 156/428 X |
| 3,730,795 | 5/1973 | Medney et al. | 156/428 |
| 3,778,327 | 12/1973 | Fairchild | 156/425 |
| 4,012,272 | 3/1977 | Tiner | 156/429 |
| 4,292,113 | 9/1981 | Hirata | 156/428 |

FOREIGN PATENT DOCUMENTS
453581 12/1948 Canada ................................ 156/429

Primary Examiner—Ervin M. Combs
Attorney, Agent, or Firm—Francis X. LoJacono

[57] ABSTRACT

An apparatus for forming flexible tubing wherein the apparatus provides a tube-forming mandrel adapted to form a continuous, reinforced, flexible tube from an indefinite length of a tape or ribbon of flexible material, together with an indefinite length of wire, which are wound and bonded together to form the tube. The mandrel includes a plurality of angularly disposed cylindrical rollers which are rotatably positioned adjacent each other, each roller being fixed at a given angular displacement with respect to the other and to the central axis of the mandrel, in order to establish the fixed skewed arrangement of a plurality of annular grooves formed in each roller, so as to allow the forming tube to advance axially along the rollers. The rollers are journaled at one end to a support plate and at the opposite end to a truss plate, the support plate and the truss plate being fixedly connected together by a centrally positioned mainstay, so as to establish the fixed skewed arrangement of the rollers and their associated annular grooves.

11 Claims, 8 Drawing Figures

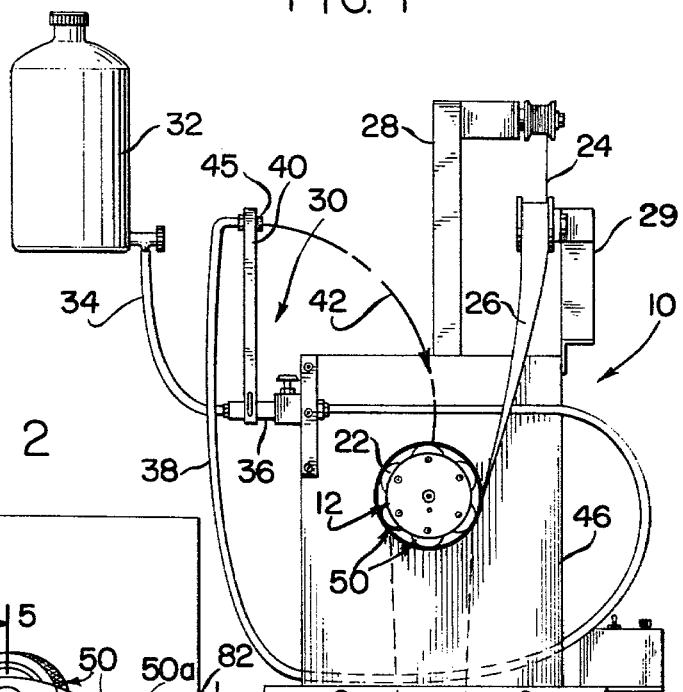
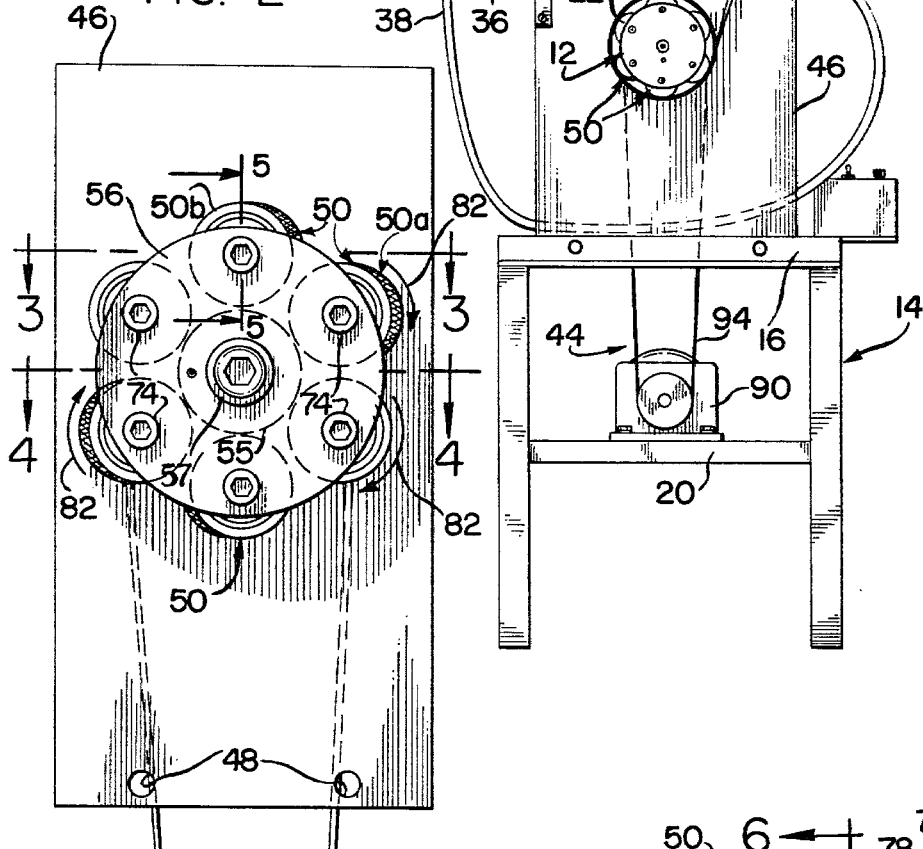
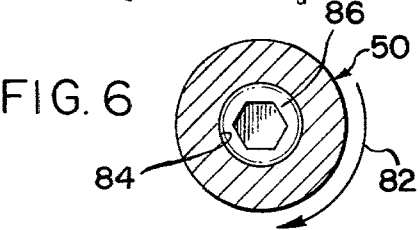
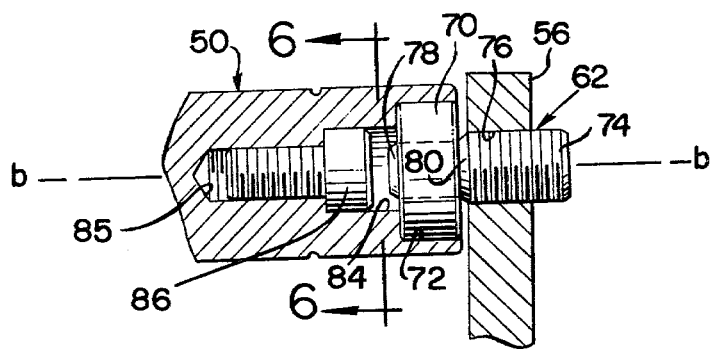

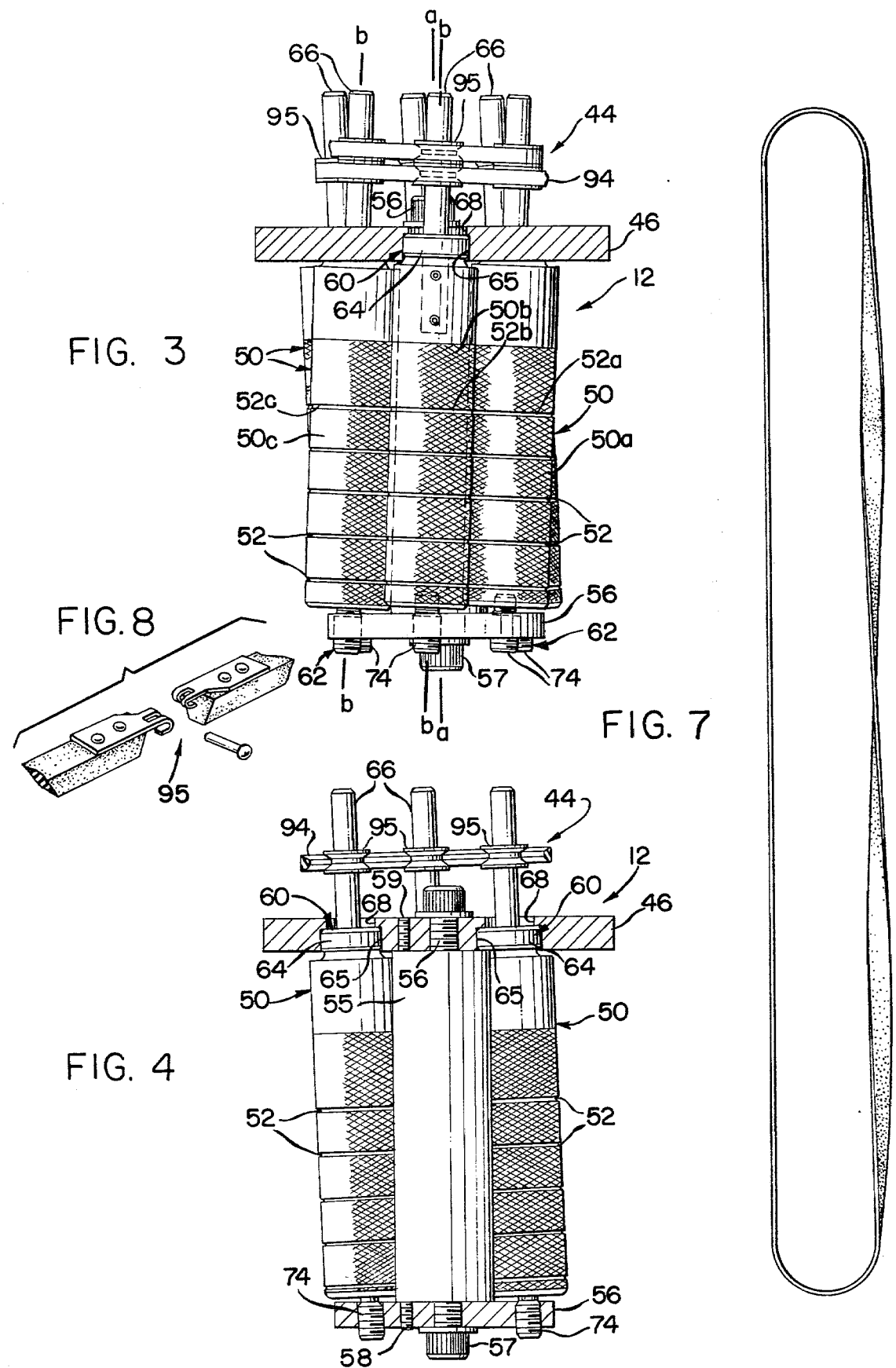

APPARATUS FOR FORMING FLEXIBLE TUBING

BACKGROUND OF THE INVENTION

1. Field of the Invention

This invention relates generally to an apparatus for forming flexible tubular structures, and more particularly to an improved mandrel device to provide specific angular displacement for the respective mandrel rollers and their associated annular grooves.

2. Description of the Prior Art

It is well known in the art that various problems and difficulties are encountered in providing suitable means to form a continuous indefinite length of flexible tubing or ducting, particularly the type of tubing that is formed from an indefinite length of flexible ribbon-like material that must be wrapped about a continuous strand of wire as the ribbon and the wire are simultaneously wound about the rotating rollers of the mandrel.

Several machines and devices are used for forming such tubing so as to produce tubing or ducting in endless lengths. However, these known devices or apparatuses have features that either restrict their use so that they cannot produce a perfect uninterrupted continuous length of tubing, or they are so complicated to operate that they become prohibitively expensive to maintain.

It should be noted that the angular displacement of each mandrel is very critical. Thus, any movement of any one of the rollers will cause a mismatch between the moving ribbon and the associated wire that it must cover as the sealing takes place.

Flexible-tube manufacturing machines, such as the type disclosed in U.S. Pat. No. 3,778,327 to Fairchild (the inventor of the present apparatus), have been found to be workable—but with limitations as to output and diameter size.

In addition, machines known at this time do not provide sufficient structural support for their rollers to prevent angular misalignment of the respective rollers during prolonged operation. In this connection, an example of a tubing apparatus is disclosed in U.S. Pat. No. 4,012,272 wherein the rollers are adapted to be adjusted to produce various sizes of ducting. This arrangement, however, does not provide a substantial structural support to prevent misalignment of the rollers during use.

Accordingly, it has been found in the art that the angular displacement of the rollers and their associated annular grooves must be held in exact cooperating relationship to provide for a continuous production of tubing—particularly at high speeds. It has also been established that, in order to increase the diameter size of the tubing, not only does the angular displacement of the respective rollers change, but the number of rollers must increase or decrease according to the specific diameter. Ducting or tubing is made approximately from one inch in diameter to more than three feet in diameter. Thus, the machines as now designed have great difficulty in meeting such variations in size.

SUMMARY OF THE INVENTION

In accordance with the invention claimed, there is provided a new and improved mandrel for producing a flexible, wire-reinforced tubing or ducting having a structural arrangement that includes a support plate to which the rollers are journaled at an angular displacement with respect to each other and the central axis of the mandrel defined by the centrally positioned mainstay post which extends outwardly, in order to support a truss plate to which each extended roller is rotatably mounted.

Thus, it is an object of the present invention as herein disclosed to provide the necessary arrangement of the mandrel structure so as to overcome the aforementioned problems and difficulties.

A further object of the invention is to provide a basic mandrel-support structure that can be employed with any number of required rollers, and that can be readily interchanged with the standard operating machines.

Another object of the invention is to provide a tube-making apparatus capable of producing a greater quantity of flexible ducting having a higher quality and less imperfections.

Still another object of the present invention is to provide an apparatus of this character that is easy to operate, service and maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is an end-elevational view of a flexible tube-producing apparatus incorporating the present invention;

FIG. 2 is an enlarged front-elevational view of the mandrel having a plurality of rollers defined thereby;

FIG. 3 is a cross-sectional view taken substantially along line 3—3 of FIG. 2;

FIG. 4 is a cross-sectional view taken substantially along line 4—4 of FIG. 2;

FIG. 5 is an enlarged cross-sectional view taken substantially along line 5—5 of FIG. 2 illustrating the supporting means for the front end of a roller;

FIG. 6 is a cross-sectional view taken along line 6—6 of FIG. 5;

FIG. 7 is an elevational view of an alternative drive belt; and

FIG. 8 is an exploded view of a connecting means for a typical drive belt.

DESCRIPTION OF THE PREFERRED EMBODIMENT

Referring to the drawings and more particularly to FIG. 1, there is shown a flexible-tube-producing machine, generally indicated at 10, having included thereon a novel tube-forming mandrel, generally designated at 12, which is removably attached to a suitable structure such as a table 14, the table being defined by a substantially horizontal top 16 and a plurality of vertical legs 18 having an intermediate shelf 20 mounted thereto.

The present invention is particularly adapted for making a flexible continuous tubing or ducting 22 which is formed on the moving mandrel 12. The ducting 22 may be produced from a wide variety of materials. However, it is usually formed by continuously wrapping one or more components in a spiral to form an endless length of ducting 22, shown being formed about mandrel 12 in FIG. 1.

Ducting 22 is of the flexible variety and is formed by spirally wrapping a spiral strand of wire 24 together with a continuous tape or ribbon 26 consisting of a flexible material. The flexible material may be of any suitable type, such as vinyl or other plastic, open-mesh scrim cloth, or a thin ribbon of metal foil (generally aluminum). The material to be selected depends upon the particular environment where the tubing or ducting is to be installed.

The tape or ribbon 26 of material is wrapped around and supported by spiraled wire 24 defining a coil spring. During the forming operation, the wire-coil spring 24 is encapsulated between the overlapping edges of the tape or ribbon 26 as they are brought together about the mandrel 12.

The position and location of wire 24 and ribbon 26 are by way of example; and it should be noted that the respective support brackets 28 and 29 may be positioned in various other suitable locations.

Suitable fastening means may be provided to fasten together the ribbon and the wire in order to define an integral structure. The fastening means, generally indicated at 30, may be any desired variety appropriate for the materials being used. If the ribbon is a plastic, a suitable cement, adhesive or solvent is generally provided for bonding the overlapping turns of ribbon 26 together. In the illustration of FIG. 1, a solvent is stored in a reservoir 32 mounted above the mandrel. A supply tube 34 extends from reservoir 32 to an applicator valve 36; and an outlet tube 38 extends from valve 36 to an applicator-arm member 40 which, when rotated downwardly as indicated by arrow 42, will contact ribbon 26 at the proper bonding location as the mandrel is rotated by a drive means, designated at 44. The vertical positioning of applicator arm 40 as shown causes valve 36 to close. Thus, when applicator arm 40 is lowered to a contacting position, valve 36 is opened—whereby the solvent flows from an applicator pad 45.

It is important to note that, although mandrel 12 is illustrated as having six mandrel rollers, any number may be employed—depending upon the diameter required for the particular size duct to be manufactured.

Accordingly, mandrel 12 comprises a support plate 46 adapted to be removably attached to table structure 14—the holes 48 allowing mandrel 12 to be secured to top member 16 with bolts 49. Thus, various sizes of mandrels can be interchanged with the above-described basic equipment.

Rotatably supported in support plate 46 is a plurality of mandrel rollers 50, each being angularly disposed with respect to the central axis a—a of the mandrel, as seen in FIG. 3. Each roller 50 is provided with a plurality of annular grooves 52. These grooves 52 are intended to receive the spiraled wire 24 so as to be formed into a coil-like spring—the depth of the grooves being adequate to guide the wire 24. The grooves 52 are equally spaced longitudinally along the length of rollers 50 and are angularly disposed relative to the central axis a—a. Each group of grooves is angularly aligned with the group of grooves 52 on the adjacent roller. This arrangement establishes the relative pitch of the ribbon and the wire, and controls the amount of longitudinal travel along the axis of the mandrel.

It should be noted that the longitudinal spaces between the grooves of each roller are of the same size. However, the arrangement of the grooves on each roller is such that grooves 52a of roller 50a are positioned forwardly of grooves 52b of roller 50b; and grooves 52c of roller 50c are positioned rearwardly of grooves 52b. Thus, a pitch is established for the winding of wire 24 and ribbon 26 as they are joined and bonded. This arrangement further carries the formed tubing outwardly over mandrel 12. It can, therefore, be understood that the alignment of each group of grooves with respect to the adjacent group of grooves, together with the angular displacement of the rollers, are very critical factors in providing an uninterrupted production of continuous ducting.

Accordingly, in order to establish the desired angular arrangement of rollers 50, mandrel 12 includes a centrally positioned mainstay post 55 which is secured to support plate 46 by bolt 56. Mainstay post 55 extends outwardly along axis a—a, and is again secured at its outer end to a truss plate 56 by a securing means comprising bolt 57 and a lock pin 58. Lock pin 58 cooperates with lock pin 59. Lock pin 59 is locked against post 55, thus preventing it from rotating; and lock pin 58 is locked to post 55, whereby truss plate 56 is prevented from moving. Thus, rollers 50 are held in their angular relationship.

As seen in FIGS. 3 and 4, rollers 50 are locked and held in position between support plate 56 and truss plate 56, the rollers 50 being journally mounted to support plate 46 by fixed bearing means 60, and journally mounted to truss plate 56 by a novel bearing means 62, which is detailed in FIG. 5. Bearing means 60 comprises a typical fixed ball bearing 64 which is mounted within respective bores 65, and adapted to receive drive shaft 66 which extends rearwardly of plate 46 and counter bore 68. Each drive shaft 66 is secured to each respective roller 50. Bores 65 and 68 are axially aligned with axis b—b which represents the fixed angular displacement of rollers 50.

Bearing means 62 comprises a fixed ball bearing 70 which is force-fitted into bore 72 formed in the outer end of each roller, a bearing pin 74 being threadably mounted to truss plate 56. (See FIG. 5.) Bearing pin 74 is formed having a threaded body 75 received in hole 76 of plate 56, and a bearing head 78 adapted to be received in the inner race member of bearing 70— whereby the tapered annular shoulder 80 of pin 74 frictionally engages the inner race member of bearing 70. Thus, each roller is locked into position.

It should be further noted that due to the clockwise rotation of rollers 50, indicated by arrow 82 in FIG. 6, the threaded bearing pin 75 is always placed under a locking force, thus holding shoulder 80 against bearing 70 in a positive manner.

Further provided in the outer end of each roller 50 is means to remove bearing 70, when required. That is, roller 50 includes counter bore 84 and a smaller threaded bore 85 adapted to receive bearing-removal bolt 86 having a recess 87 to receive a compatible wrench. Thus, in order to remove a bearing 70, a wrench is inserted through the central opening of bearing 70—engaging bolt 86—whereby bolt 86 is rotated outwardly and forces bearing 70 out of bore 72.

Drive means 44 comprises a suitable motor 90 (shown in FIG. 1 supported on shelf 20 of table 14), motor 90 being operably connected to drive rollers 50 by means of a belt-and-pulley system. The belt-and-pulley system comprises a pulley 92 attached to motor 90, and has a belt 94 wound about a plurality of pulley members 95 affixed to shafts 66. The belt-and-pulley arrangement, shown in FIGS. 1 through 7, comprises typical V-pullies. Some of the drive shafts are provided with two adjacent pullies where belt 94 is double wound about the upper group of shafts, as seen in FIG. 3. In FIG. 4, the lower group of shafts is provided with a single pulley.

In order to prevent slipping and excessive wear on belt 94, the belt is formed having a completed 360° twist. This can be accomplished with an integral belt; or the belt can be provided with a coupling means 94, as shown in FIG. 8, wherein belt 94 is twisted as it is attached to the pullies.

FIG. 7 illustrates a flat twisted belt arrangement which may be employed on various sized mandrels.

From the foregoing, it can thus be readily seen that the rollers are locked and fixed in their selective angular relationship to axis 2—2 of the mandrel. Hence, when different sized tubing is to be produced, one simply replaces one complete mandrel with a second mandrel having the required number of rollers for the particular size tubing or ducting to be produced.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to do restricted to the specific form shown or uses mentioned, except as defined in the accompanying claims.

I claim:

1. An interchangeable mandrel unit for forming a continuous, reinforced, flexible tube from an indefinite length of ribbon material, together with an indefinite length of wire, wherein said mandrel comprises:
    a plurality of angularly disposed cylindrical rollers which are rotatably juxtapositioned relative to each other, each roller being fixed at a given angular displacement with respect to the central longitudinal axis of said mandrel;
    a plurality of fixed annular grooves formed in each roller and arranged in progressive alignment with said fixed grooves of the adjacent rollers, to allow the forming tube to advance axially along said rollers;
    a support plate adapted to be secured in a fixed position and to rotatably support one end of said rollers thereon in a pre-aligned fixed position;
    a nonadjustable truss plate adapted to rotatably support the opposite end of said rollers thereon and being fixed in a predetermined position relative to said support plate;
    a centrally disposed mainstay defining said central longitudinal axis of said mandrel, said mainstay fixedly connecting said support plate and said truss plate together in said fixed predetermined position, whereby said rollers are interposed therebetween at a fixed predetermined angular displacement with respect to said mainstay and said nonadjustable truss plate;
    a first means for journalling said rollers in said support plate, and a second means for journalling said rollers in said truss plate, wherein said first and second journal means are angularly disposed in said respective support plate and truss plate in a fixed manner;
    a first locking means included between said support plate and said mainstay, and a second locking means included between said nonadjustable truss plate and said mainstay, whereby said first locking means prevents movement between said support plate and said mainstay, and said second locking means prevents movement between said mainstay and said nonadjustable truss plate.

2. A mandrel as recited in claim 1, wherein each of said rollers includes a drive shaft supported in said first journal means.

3. A mandrel as recited in claim 2, wherein said second journal means comprises:
    a plurality of bearings adapted to be mounted in one end of said rollers; and
    a plurality of adjustable bearing pins mounted in said truss plate to engage respective bearings in said rollers, so as to allow said rollers to freely rotate about said bearing pins.

4. A mandrel as recited in claim 3, wherein said bearing pins comprise:
    an enlarged threaded body, threadably receive in said truss plate;
    a bearing head member adapted to be received in said bearing; and
    an annular tapered shoulder interposed between said threaded body and said bearing head, to engage said bearings under constant frictional contact.

5. A mandrel as recited in claim 4, wherein said first journal means comprises a plurality of bearings positioned in said support plate at a predetermined angular displacement, said angular displacement being determined by the specific number of rollers employed in a given mandrel.

6. A mandrel as recited in claim 1, wherein said first and second locking means comprise a locking pin.

7. A mandrel as recited in claim 3, wherein said rollers include means for removing one of said bearings which is mounted in one end of said rollers.

8. A mandrel as recited in claim 7, wherein said bearing removal means comprises a bolt threadably mounted within a central bore formed in said rollers, and adapted to engage said bearing mounted adjacent thereto, causing said bearing to be forceably extracted from said rollers as said bolt is threaded outwardly therefrom.

9. A mandrel as recited in claim 3, including a drive means comprising:
    a drive motor; and
    a drive belt interconnecting said motor with said drive shafts of said rollers, said drive belt being formed having a full twist therein, whereby said belt can freely engage each adjacent drive shaft to provide direct rotation thereto.

10. A mandrel as recited in claim 9, wherein said drive belt is a continuous flat member.

11. A mandrel as recited in claim 9, wherein said belt is a V-belt, and wherein a given number of drive shafts include a double pulley and the remaining shafts include a single pulley to accommodate the overlapping of the twisted belt thereon.

* * * * *